(12) United States Patent
Stucki et al.

(10) Patent No.: US 10,150,565 B2
(45) Date of Patent: Dec. 11, 2018

(54) LOAD HOOK SUBSTRUCTURE

(71) Applicant: KOPTER GROUP AG, Mollis (CH)

(72) Inventors: Martin Stucki, Pfäffikon (CH); Cosimo Donno, Pfungen (CH)

(73) Assignee: KOPTER GROUP AG, Mollis (CH)

( * ) Notice: Subject to any disclaimer, the term of this patent is extended or adjusted under 35 U.S.C. 154(b) by 88 days.

(21) Appl. No.: 15/241,156

(22) Filed: Aug. 19, 2016

(65) Prior Publication Data

US 2017/0050731 A1   Feb. 23, 2017

(30) Foreign Application Priority Data

Aug. 21, 2015   (CH) ........................................ 1210/15

(51) Int. Cl.
*B64D 1/22*    (2006.01)
*F16F 3/10*    (2006.01)
(Continued)

(52) U.S. Cl.
CPC ................ *B64D 1/22* (2013.01); *B64C 27/04* (2013.01); *B64D 1/02* (2013.01); *B64D 9/00* (2013.01);
(Continued)

(58) Field of Classification Search
CPC ........ F16F 3/10; F16F 3/08; F16F 3/04; F16F 15/085; B64D 1/22; F16M 13/02
(Continued)

(56) References Cited

U.S. PATENT DOCUMENTS

| 1,465,120 | A | * | 8/1923 | Fair | ......................... E21B 19/02 |
| | | | | | 24/698.1 |
| 1,873,325 | A | * | 8/1932 | Ratigan | ..................... F16F 3/04 |
| | | | | | 267/70 |

(Continued)

FOREIGN PATENT DOCUMENTS

| EP | 2543594 A2 | 1/2013 |
| GB | 1307769 A  | 2/1973 |
| WO | 01/74143 A1 | 10/2001 |

OTHER PUBLICATIONS

European Search Report dated Jan. 9, 2017 for Application No. 16183355.3 (related application).

*Primary Examiner* — Thomas J Williams
*Assistant Examiner* — James K Hsiao
(74) *Attorney, Agent, or Firm* — Paul D. Bianco; Gary S. Winer; Fleit Gibbons Gutman Bongini & Bianco PL (57) ABSTRACT

A load hook substructure for attachment onto or into the cabin structure of a helicopter, having a housing in which a shaft with a hook attachment is mounted, such that a load hook can be connected with the shaft and thereby with the load hook substructure; this improves the flying characteristics of the helicopter in the case of flights with a load carried underneath. This is achieved in that the shaft passes through the interior of the housing in the longitudinal direction between a housing end wall and a housing wall, such that it can move linearly, and a return spring device is arranged between a damping plate arranged on the shaft and the housing end wall, and a damping device is arranged between the damping plate and the lower housing wall. The damping device has at least one flexibly compressible damping element, which develops a damping action in the event of a linear movement of the shaft.

14 Claims, 6 Drawing Sheets

(51) Int. Cl.
  *B64C 27/04* (2006.01)
  *B64D 1/02* (2006.01)
  *B64D 9/00* (2006.01)
  *F16F 3/04* (2006.01)
  *F16F 15/08* (2006.01)
  *F16M 13/02* (2006.01)

(52) U.S. Cl.
  CPC .............. *F16F 3/04* (2013.01); *F16F 3/10* (2013.01); *F16F 15/085* (2013.01); *F16M 13/02* (2013.01)

(58) Field of Classification Search
  USPC .............................................. 248/569, 562
  See application file for complete search history.

(56) References Cited

U.S. PATENT DOCUMENTS

| | | | | |
|---|---|---|---|---|
| 1,935,283 A * | 11/1933 | Adams | B64D 1/22 | 258/1.8 |
| 2,010,623 A * | 8/1935 | Bugatti | F16F 7/09 | 188/129 |
| 2,058,186 A * | 10/1936 | Spalding | E21B 19/04 | 267/71 |
| 2,124,692 A * | 7/1938 | Stokes | E21B 19/04 | 267/71 |
| 2,492,501 A * | 12/1949 | Robins | B64D 1/02 | 244/138 R |
| 2,744,718 A * | 5/1956 | Markowski | F16F 1/362 | 267/140.11 |
| 2,917,265 A * | 12/1959 | Markowski | F16F 3/10 | 267/134 |
| 3,041,028 A * | 6/1962 | McDowell | B61D 45/005 | 410/62 |
| 3,052,435 A * | 9/1962 | Roller | F16F 3/10 | 248/569 |
| 3,053,526 A * | 9/1962 | Kendall | F16F 9/303 | 188/268 |
| 3,068,034 A | 12/1962 | Campbell | | |
| 3,176,939 A | 4/1965 | Mard et al. | | |
| 3,178,037 A * | 4/1965 | Kendall | B61G 9/08 | 213/40 R |
| 3,332,523 A * | 7/1967 | Chambers | F16F 7/09 | 188/129 |
| 3,473,796 A * | 10/1969 | Moulliac Valleteau De | B61G 11/10 | 213/22 |
| 3,547,426 A * | 12/1970 | Sebern | E02F 3/6454 | 267/138 |
| 3,677,507 A | 7/1972 | Kendall et al. | | |
| 3,713,641 A * | 1/1973 | Kendall | B60R 19/32 | 267/139 |
| 3,741,560 A * | 6/1973 | Schaller | B60R 19/30 | 188/268 |
| 3,921,959 A * | 11/1975 | Ulbing | B66D 3/18 | 254/270 |
| 3,929,729 A * | 12/1975 | Chung | C08G 18/10 | 267/138 |
| 3,948,497 A * | 4/1976 | Lovitt | B60R 19/30 | 267/201 |
| 4,018,452 A * | 4/1977 | Wagatsuma | B60D 3/00 | 172/678 |
| 4,395,178 A * | 7/1983 | MacDonell | B63B 27/30 | 114/259 |
| 4,415,146 A * | 11/1983 | Sitko | B60G 15/04 | 267/202 |
| 4,434,863 A * | 3/1984 | Garrett | E21B 4/003 | 175/297 |
| 5,257,680 A * | 11/1993 | Corcoran | F16F 7/02 | 188/129 |
| 5,295,901 A * | 3/1994 | Sexton | F23J 13/08 | 454/29 |
| 5,593,113 A * | 1/1997 | Cox | B64D 1/08 | 177/245 |
| 5,820,114 A * | 10/1998 | Tsai | F16F 3/10 | 267/202 |
| 5,946,946 A * | 9/1999 | Sharp | D06F 37/20 | 188/129 |
| 5,961,070 A * | 10/1999 | Bradford | B64D 1/22 | 144/335 |
| 6,079,698 A * | 6/2000 | Patterson | F16F 3/10 | 267/136 |
| 6,260,873 B1 * | 7/2001 | Bishel | B60D 1/145 | 267/138 |
| 6,386,513 B1 * | 5/2002 | Kazerooni | B66C 1/0212 | 212/285 |
| 6,394,435 B1 * | 5/2002 | Monson | F16F 7/123 | 267/141.1 |
| 6,474,113 B1 * | 11/2002 | Park | D06F 37/24 | 68/23.3 |
| 6,691,991 B1 * | 2/2004 | Huang | B60G 15/063 | 267/286 |
| 7,175,150 B2 * | 2/2007 | Chi | F16F 3/10 | 248/562 |
| 7,467,723 B2 * | 12/2008 | Zaguroli, Jr. | B66C 9/14 | 212/331 |
| 7,503,553 B2 * | 3/2009 | Brannan | B62D 33/10 | 267/248 |
| 7,648,563 B2 * | 1/2010 | Doehla | B01D 46/0005 | 267/166 |
| 8,157,067 B2 * | 4/2012 | Ruthinowski | B60N 2/2809 | 188/372 |
| 8,210,477 B2 * | 7/2012 | Stabenau | F41H 5/013 | 244/118.1 |
| 8,532,846 B2 * | 9/2013 | Tollenaere | G05D 1/0858 | 244/75.1 |
| 8,534,608 B1 * | 9/2013 | Cox, IV | A01G 23/095 | 244/118.1 |
| 2003/0183994 A1 * | 10/2003 | Atwater | F16F 13/007 | 267/71 |
| 2008/0001335 A1 * | 1/2008 | Kay | B60P 7/0838 | 267/71 |
| 2010/0171251 A1 * | 7/2010 | Matsuda | B60G 11/12 | 267/271 |
| 2011/0079678 A1 * | 4/2011 | Brenner | B64C 27/001 | 244/17.13 |
| 2011/0114427 A1 * | 5/2011 | Panda | B61G 11/12 | 188/268 |
| 2011/0204550 A1 * | 8/2011 | Pepka | F16F 1/125 | 267/168 |
| 2012/0186436 A1 * | 7/2012 | Panda | B61G 11/12 | 89/36.08 |
| 2014/0001684 A1 * | 1/2014 | Miyata | B62J 1/04 | 267/132 |
| 2014/0162797 A1 * | 6/2014 | Priest | A63G 9/14 | 472/118 |
| 2014/0346793 A1 * | 11/2014 | DeStories | B25J 15/0028 | 294/86.4 |
| 2015/0158479 A1 * | 6/2015 | Maki | B60T 17/046 | 248/613 |
| 2015/0360779 A1 * | 12/2015 | Behrens | B64D 1/22 | 244/137.4 |

\* cited by examiner

LOAD HOOK SUBSTRUCTURE

FIELD OF THE INVENTION

The present invention describes a load hook substructure for purposes of attachment onto or into a cabin structure of a helicopter, comprising a housing, in which a shaft with hook attachment means is mounted, such that a load hook can be connected with the shaft and thereby with the load hook substructure.

BACKGROUND

Amongst other tasks helicopters are employed for load-carrying flights, wherein an item of freight, mounted outside the helicopter cabin, is transported by the helicopter from A to B. Various materials for various construction or maintenance tasks can be transported as the load, or in the case of rescue flights, a stretcher with living persons. As a general rule a load hook that can be remotely operated, with or without a load cable, is arranged on the outside of the helicopter, directly on the underside of its cabin, wherein during the load-carrying flight tensile forces are transferred directly from the load hook onto the underside of the cabin. Such a design is a simple and cost-effective solution, wherein the load hook can easily be removed when it is not in use. The load hook, or more particularly, a load hook substructure to which the load hook is attached, can participate in small swinging movements of the load during the flight; the possibilities for movement are however limited by the design, and such a structure is rather rigid.

Other forms of embodiment are of known art, in which the load hook is attached to a separate load hook substructure. Here the load hook substructure is arranged such that it projects from the helicopter cabin in the direction of the skids, and thus is spaced apart from the underside of the helicopter cabin. The load hook on such a load hook substructure can accordingly be swung further, as allowed by the design, and such a system has a small degree of flexibility. The load hook substructure in the form of a mounting frame is bolted onto attachment points on the underside of the cabin, and can similarly be removed when not in use, together with the load hook. However, such mounting frames are bulky and have inferior aerodynamic properties. In addition to the higher costs of such a mounting frame the higher weight and maintenance tasks required by the mechanical design are disadvantageous.

Figure 1A:
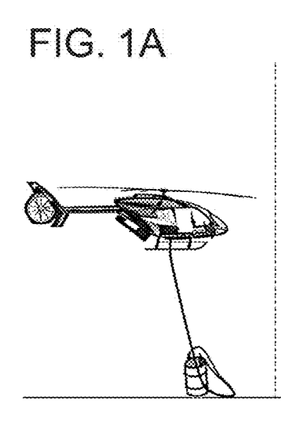
FIGS. 1A, 1B, and 1C show various tensile loads before lift-off (FIG. 1A), in the state of maximum tensile stress on the load cable (FIG. 1B), and during forward flight of a helicopter (1C).
Figure 1B:
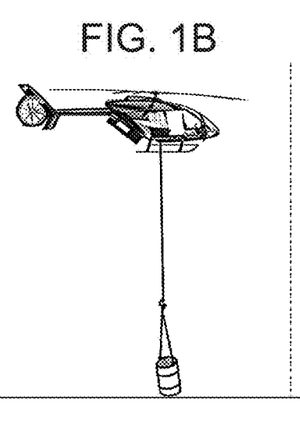
Figure 1C:
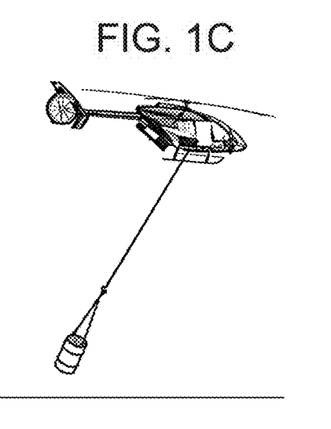

During a load-carrying flight high tensile forces act in different ways on the load hook, and indirectly on the underside of the cabin. A load is usually attached to the helicopter in hovering flight, as shown in FIG. 1A. The load rests on the ground and while the helicopter slowly rises, the load cable becomes taut by virtue of the tensile force of the load. As shown in FIG. 1B a maximum tensile force acts on the load hook, and thus on the helicopter cabin, at the point at which the load lifts from the ground. The load hook, load cable, load hook substructure, and helicopter cabin must be able to withstand these peak loads. During forward flight (FIG. 1C), or during flight manoeuvres of all kinds with an accompanying load, vibrations occur, wherein the load vibrates at various frequencies in the direction of gravity.

The load hook substructures of load hooks used up to the present time, together with the load hooks themselves, have no precautionary measures, or virtually no such measures, for reducing the peak loads, or for damping any vibrations that may occur. Since the flying characteristics of the helicopter are affected by the high tensile forces of the loads, and also by the vibrations, the peak loads and vibrations should be kept as low as possible.

SUMMARY OF THE INVENTION

The creation of a load hook substructure of a load hook for helicopters, which improves the flying characteristics of the helicopter in the case of flights with a load carried underneath, is disclosed.

Peak loads and vibrations on the load hook, and/or on the helicopter cabin, are to be greatly reduced during a load-carrying flight.

Also disclosed is creating a cost-effective, simple and aerodynamically efficient load hook substructure, virtually maintenance-free, for purposes of suspending a load hook.

BRIEF DESCRIPTION OF THE DRAWINGS

A preferred example of embodiment of the inventive subject is described in what follows, in conjunction with the accompanying figures.

FIG. 3A shows a perspective view of a load hook substructure with a hollow cylindrical housing and a housing flange, while FIG. 3B shows a perspective view of a load hook substructure with a hollow cylindrical housing and a housing eye.

FIG. 4A shows a schematic sectional view of an installed hydromechanically-operated load hook substructure in an unloaded position, while

FIG. 5A shows a longitudinal section of a load hook substructure with a mechanical damping device, comprising a plurality of damping elements, while

FIG. 6A shows a schematic exploded view of the load hook substructure in FIG. 5A, while FIG. 6B shows a schematic exploded view of the damping device with two element stacks, in each case with two damping elements 130.

FIG. 7A shows in a force diagram the peak loads with a suspended load, with and without the inventive load hook substructure, while

DETAILED DESCRIPTION

Figure 2:
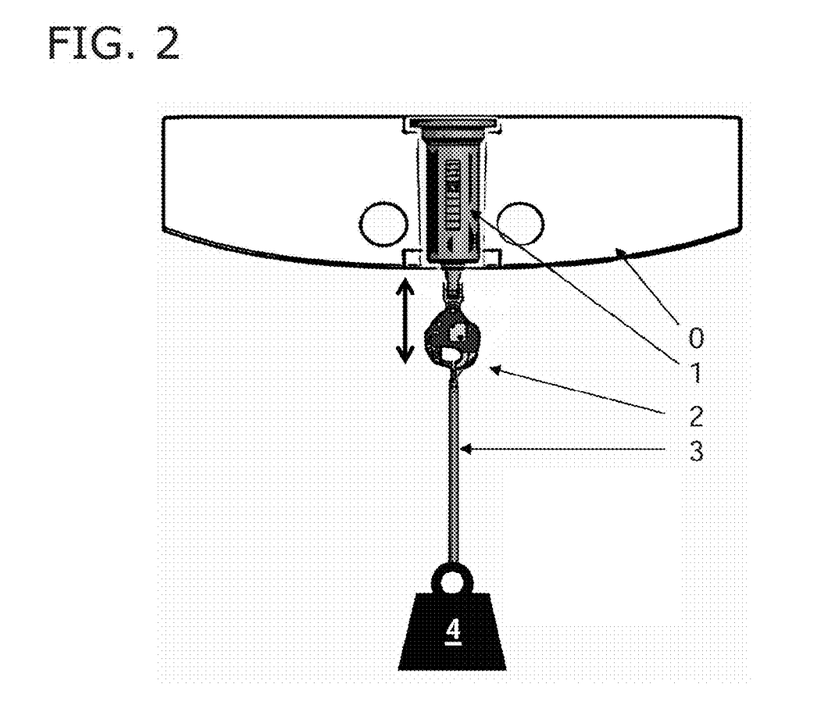
FIG. 2 shows a plan view onto a load hook substructure recessed into a cabin structure of a helicopter.

In FIG. 2 is shown a cabin structure 0, in particular of a helicopter, into which is recessed a load hook substructure 1, which is attached to the former by bolts. A load hook 2 is arranged on the load hook substructure 1, on the end facing away from the cabin structure 0; a load 4 is suspended from the load hook 2 by means of a load cable 3. In what follows the load hook substructure 1 is described in detail; here the load hook substructure 1 has damping properties, as a result of which the peak loads and vibrations on the cabin structure 0 are greatly reduced.

The load hook substructure 1 has a housing 10, which can be attached onto or into the cabin structure 0. The whole load hook substructure 1 can be attached outside the cabin structure 0, suspended, that is to say, projecting from the latter, or, as in FIG. 2, can be recessed into the cabin structure 0.

Figures 3A, 3B:
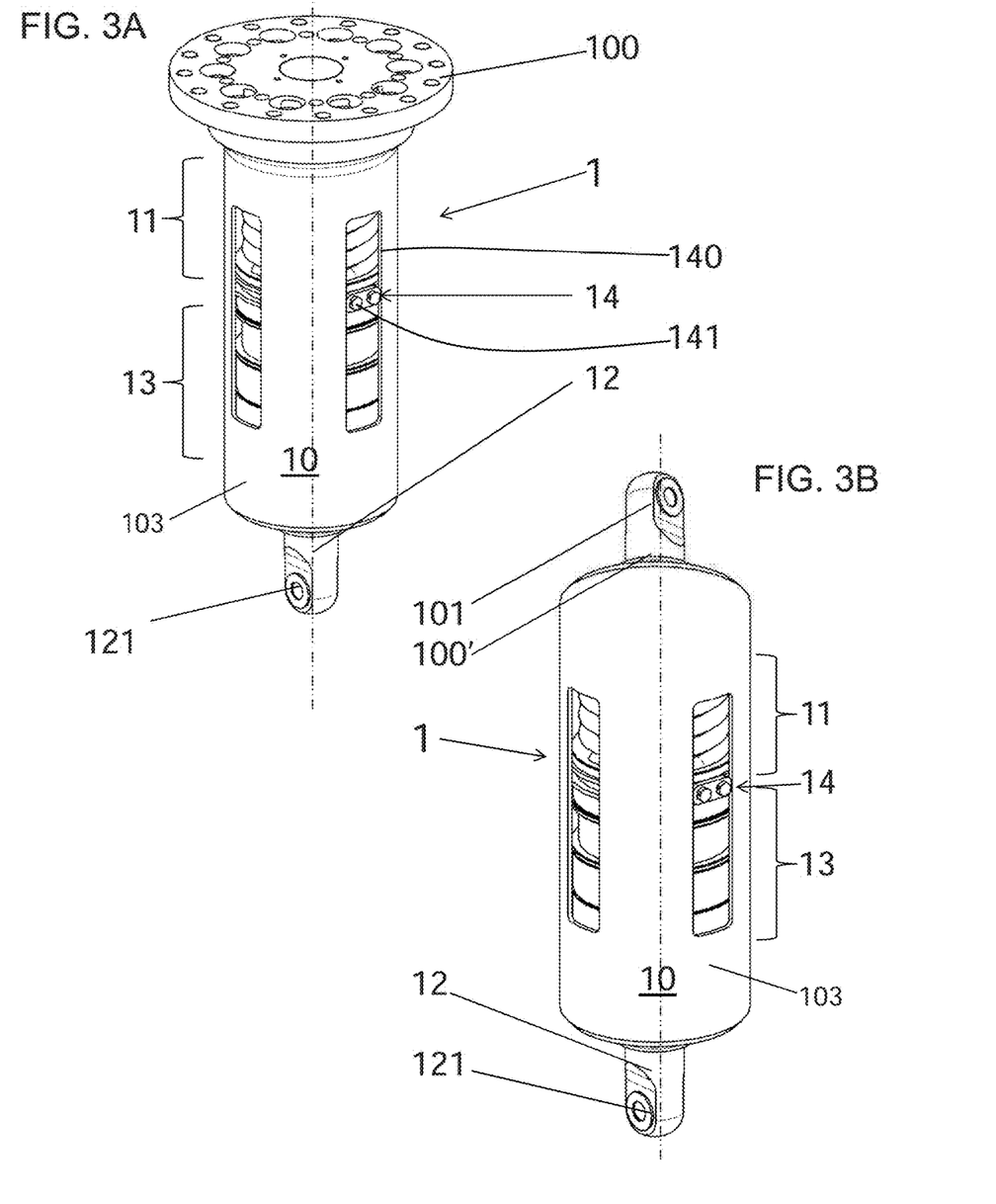

Here the housing end wall 100 can be configured as a housing flange 100, by means of which the housing 10 can be attached onto or into the cabin structure 0. However, a housing eye 101 can also be attached or formed on the housing end wall 100', by means of which the housing 10 can be attached onto the cabin structure 0.

Here the housing 10 has, for example, a hollow cylindrical wall 103. Instead of a hollow cylindrical wall 103, with a circular cross-section, a tubular wall with a rectangular cross-section could also form a part of the housing 10.

Within the housing 10, in the interior surrounded by the hollow cylindrical wall 103, is arranged both a return spring device 11 and a damping device 13, wherein a shaft 12 passes through both devices 11, 13 in the longitudinal direction. Hook attachment means 121 are arranged or are formed on the shaft 12, on the end of the shaft 12 opposite the housing eye 101 and the housing flange 100. Here an eye is configured as the hook attachment means 121, onto which the load hook 2 can be attached. The shaft 12 can be linearly extended in the longitudinal direction, wherein in FIGS. 3A and 3B the non-extended position of the shaft 12, which passes through the housing 10, is represented in each case. While the load hook substructure 1 in FIG. 3A can be attached directly onto or into a cabin structure 0, the load hook substructure 1 in FIG. 3B can also be attached by means of a cable, and thus indirectly, onto the cabin structure 0.

In order that the load hook substructure 1 is protected from excessive loads, an anti-rotation device 14 is provided. Such an anti-rotation device 14 can consist of at least one longitudinal slot 140 in the housing wall and guidance means 141, which are attached directly or indirectly onto the shaft 12. Here a plurality of longitudinal slots 140 are arranged, in which a bar, which is fixed with two bolts onto the shaft 12, makes possible a linear movement that is secured against rotation.

Figure 4A:
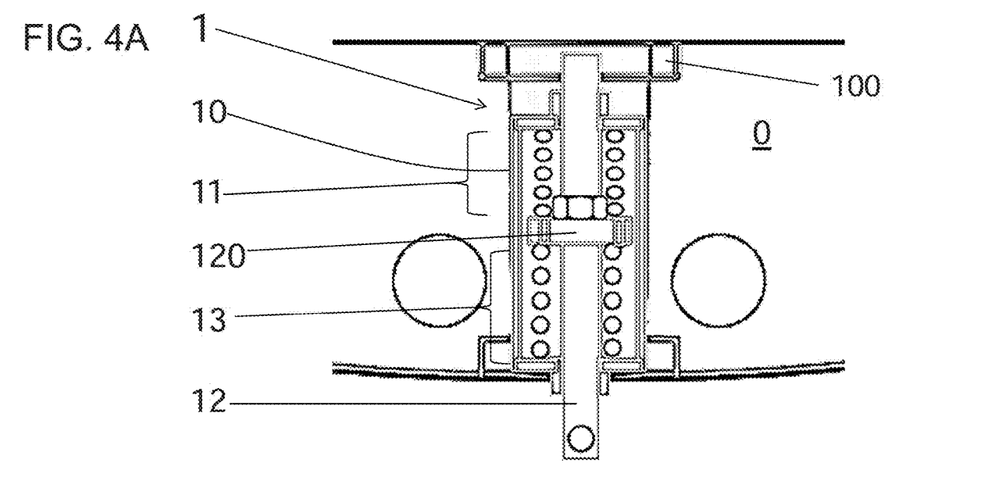
Figure 4B:
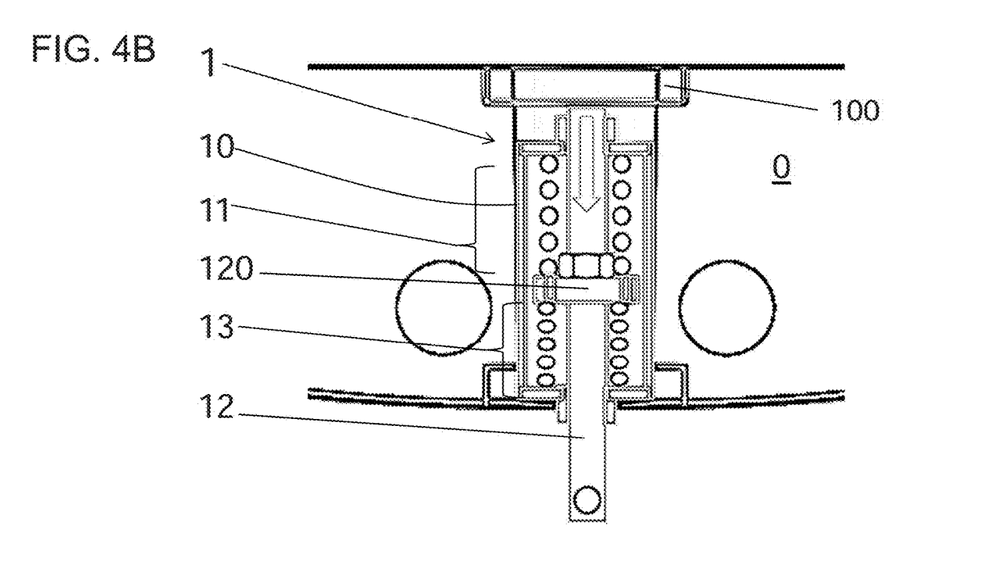
FIG. 4B shows a schematic sectional view of the load hook substructure in FIG. 4A in a loaded position.

The shaft 12 of the load hook substructure 1 in FIG. 4A is also located in the non-extended state. In this partially sectioned view the return spring device 11 and the damping device 13 are accordingly also represented in an unloaded state, that is to say, non-extended. In the said form of embodiment represented here the housing 10 is embodied such that it is sealed against fluid, and is filled with a fluid, not represented; usually an oil is used for this purpose. Thus, in actual fact, a hydromechanical form of embodiment is achieved, although this places higher requirements on the configuration of the housing and its implementation. Here the return spring device 11 and the damping device 13 both have a spring. The spring of the damping device 13 is arranged as a damping element between a damping plate 120 and a lower housing cover, while the spring of the return spring device 11 is arranged between the damping plate 120 and an upper housing cover facing towards the housing flange 100. The return spring device 11 pulls an unloaded shaft 12 into the non-extended position. If the shaft 12 is loaded in tension, the shaft 12 together with the damping plate 120 is extended downwards, that is to say, away from the housing flange 100, as a result of which the spring of the damping device 13 is squeezed. In the event of tensile loading damping can thus be achieved, in that the damping plate 120 squeezes the damping device 13 to a certain extent.

Figure 5A:
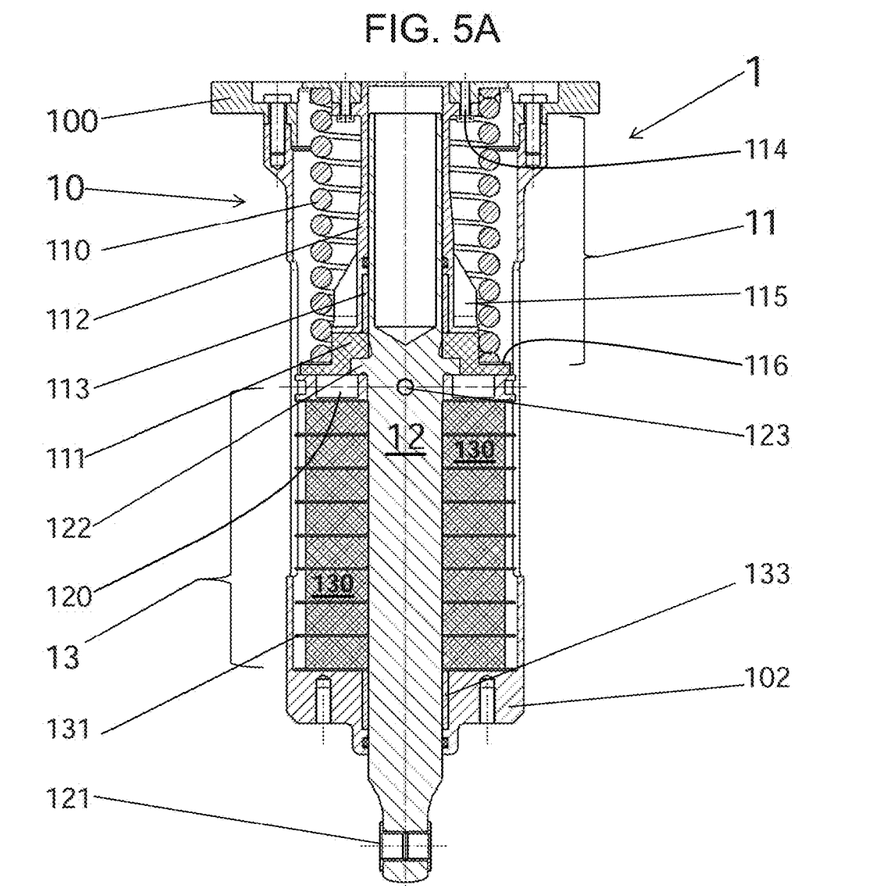

In FIG. 5A is shown a load hook substructure 1, which has a mechanical damping device 13. In a housing 10, closed at one end by the housing flange 100, the shaft 12 is mounted such that it can move linearly parallel to the longitudinal axis. On the one hand the interior of the housing 10 is closed by means of the housing flange 100; on the other hand, the load hook substructure 1 can be attached by means of the housing flange 100 to the cabin structure 0, which is not represented here.

The return spring device 11 is attached onto the housing end wall 100 and comprises a shaft guidance sleeve 112. The shaft guidance sleeve 112 is attached by attachment means 114 onto the inner surface of the housing flange 100. The shaft 12 is arranged such that it projects into the shaft guidance sleeve 112; here the shaft 12 is configured to be partially hollow. The shaft can be moved linearly, guided by a first shaft bearing 113 in the sleeve interior.

A spring plate 111 is located on the outer surface of the shaft 12; this is held by means of a peripheral shoulder 122 of the shaft 12. On a washer 116, which lies on the side of the spring plate 111 facing towards the shaft guidance sleeve 112, a spring 110 is mounted as a compression spring 110 between the spring plate 111 and the housing flange 100 within the housing 10 and is operatively connected between them; the spring 110 surrounds the shaft guidance sleeve 11 and part of the shaft 12. The spring 110 is attached directly or indirectly onto the housing end wall 100 and onto the shaft 12. Spring-spreader means 115 on the shaft guidance sleeve 112 ensure that the spring 110 surrounds the shaft guidance sleeve 112 and thereby the shaft 12 in the region of the return spring device 11.

The shaft 12 has a damping plate 120, wherein the damping plate 120 can be formed on, or attached to the shaft 12 by means of plate attachment means 123. Here a plate attachment means 123 is provided in the form of a bore in the shaft 12, into which a bolt can be introduced, with which bolt the damping plate 120 can be detachably attached to the shaft 12.

On the damping plate 120 at least one damping element 130 is then arranged on the shaft 12 in the housing interior between the damping plate 120 and a housing wall 102, at the end of the housing 10 facing away from the housing flange 100. The shaft 12 passes through a second bearing 133 and the housing wall 102 at the end facing away from the shaft guidance sleeve 112, and then passes out of the housing 10. A load 4 can simply be attached to the shaft 12 on the hook attachment means 121.

In FIG. 5A a plurality of damping elements 130, is selected, in particular these are layered in an annular shape. The said damping rings 130 are formed from a flexible material, and are at least partly deformable in an elastic manner. Here reinforcing walls 131 are provided for purposes of increasing stability; these are similarly configured in an annular shape, and are in each case connected with at least one damping ring 130. In order to achieve an optimal stability each damping element 130 can be surrounded by a reinforcing wall 131 on either side in the direction of the longitudinal axis. A reinforcing wall 131 can optionally also be arranged between an outer damping element 130 and the damping plate 120, and/or between an outer damping element 130 and the lower housing wall 102.

In the operational state, that is to say, in the loaded state, if a load 4 by means of a load hook 2 attached onto the shaft 12 causes a downward tensile load, the shaft 12 is pulled downwards in the direction of the load 4, wherein the damping plate 120 compresses or squeezes the damping elements 130 that are located between the damping plate 120 and the housing wall 102. Depending upon the elasticity of the plurality of damping elements 130 a damping action, that is to say, a spring action, can be achieved when a tensile load is applied to the shaft 12. The shaft 12 executes a linear movement relative to the shaft guidance sleeve 112 in the housing interior, wherein it can pass out of the housing 10 as far as a stop. The damping device 13 provides a damping action for the said linear tensile movement.

Figure 5B:
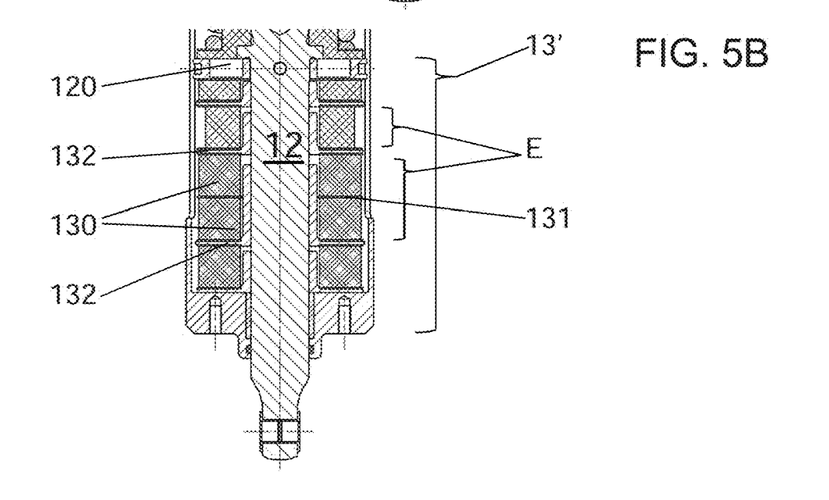
FIG. 5B shows a longitudinal section through a load hook substructure in the region of the damping device, comprising a plurality of damping elements, which are arranged packed together in a plurality of element stacks.

In a slightly modified damping device 13' a plurality of damping elements 130, which once again can be configured as damping rings, are arranged in a plurality of element stacks E, comprising one or a plurality of damping elements 130. Each element stack E is held by a stack holder 132 and comprises at least one damping element 130. In FIG. 5B is shown an example with four element stacks E, wherein three element stacks E have one damping element 130, and one element stack E has two damping elements 130. Here too a reinforcing wall 132 can optionally be arranged between two damping elements 130, adjacent in the direction of the longitudinal axis, for purposes of stabilisation. In the event of tensile loading the shaft 12 is pulled downward, wherein the damping plate 120 acts upon the element stacks E.

The stack holders 132 are thereby pushed downwards in the direction of the load 4 by the damping plate 120, wherein an elastic deformation of the damping elements 130, and thereby a damping of the tensile force, is achieved. Here at least one sidewall of the stack holder 132 serves as a stop, which prevents any further compression of the damping elements 130 in the element stack E in question.

The guidance of the shaft 12 in the first shaft bearing 113, and in the second shaft bearing 133, ensures a purely linear movement. The damping elements 130 that are used can be formed from the same or different materials. The stack holders 132 are preferably embodied in metal and are thereby stiff in bending. The stack holders 132 should be designed to be more rigid and stiffer in bending than the damping elements 130.

The damping elements 130 are configured so as to be elastically deformable, that is to say, compressible, so that a damping action, that is to say, a spring action can be achieved if the shaft 12 is extended away from the cabin structure 0.

In the event of removal of the load the shaft 12 is once again pulled into the unloaded basic state within the shaft guidance sleeve 112, that is to say, within the housing 10, by the return spring device 11 of the load hook substructure. The said return spring action can be achieved by the spring 110 as described above.

Figures 6A, 6B:
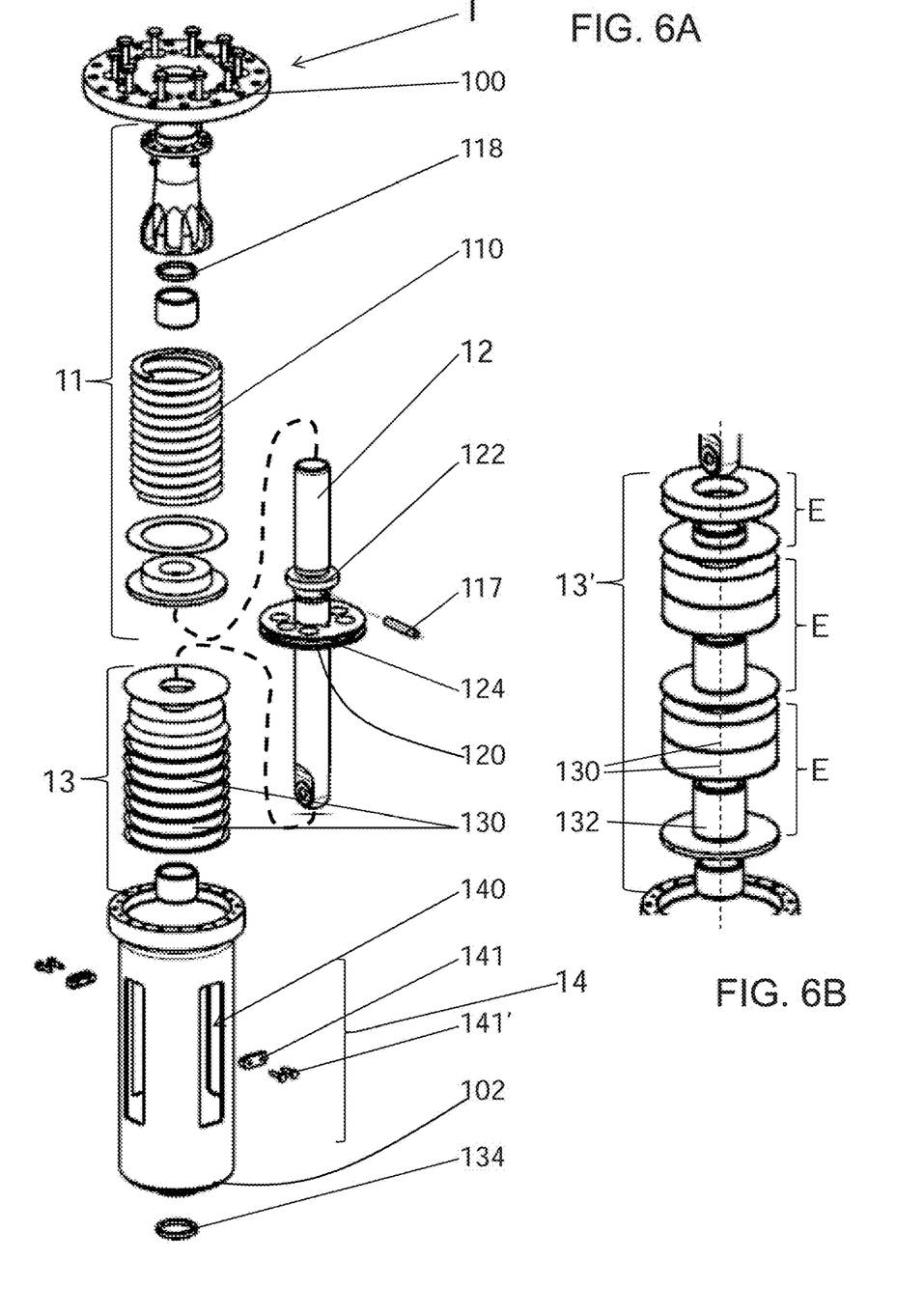

In the exploded view in FIG. 6A, a damping device 13 is shown with a plurality of damping elements 130 in the form of damping rings as in FIG. 5A. The individual components can be stacked within one another, wherein one O-ring 118 in the region of the return spring device 11 in the housing interior, and one O-ring 134, which is located in the housing wall 102, are used. In the complete structure a spring retention pin 117 holds the spring 110 in position. The individual damping elements 130 are arranged between the damping plate 120 and the housing wall 102, such that they can be elastically deformed.

In order that the shaft 12 executes a purely linear movement the anti-rotation device 14 is provided. The said anti-rotation device 14 prevents any rotation of the shaft 12 about its longitudinal axis. Here the anti-rotation device 14 is similarly configured in terms of at least one longitudinal slot 140 in the housing sidewall, in which the guidance means 141, 141' can be moved in a linearly guided manner. Here the guidance means 141 is designed as a bar, which is attached by means of at least one bolt 141' to the periphery of the damping plate 120 in a guidance means seating 124. Two longitudinal slots 140 are preferably recessed into the housing 10, in which slots the guidance means 141 can be moved.

By virtue of the arrangement of the longitudinal slots 140 the components, after they have been stacked into one another, can be simply bolted together. The arrangement of the guidance means 141 ensures that the shaft 12 can execute a purely linear movement. Needless to say, other configurations are possible for the anti-rotation device. In particular, if a hydromechanical damping device 13 with a housing 10 sealed against fluid is required, the anti-rotation device must be achieved in another manner.

In FIG. 6B is shown an exploded view of a damping device 13' with two element stacks E, each with two damping elements 130; in each case these are arranged on a stack holder 132. In a preferred form of embodiment of the load hook substructure, the cross-sectional surface of the shaft 12 is embodied with multiple sides, as a result of which a simple anti-rotation device can be achieved.

Figure 7A:
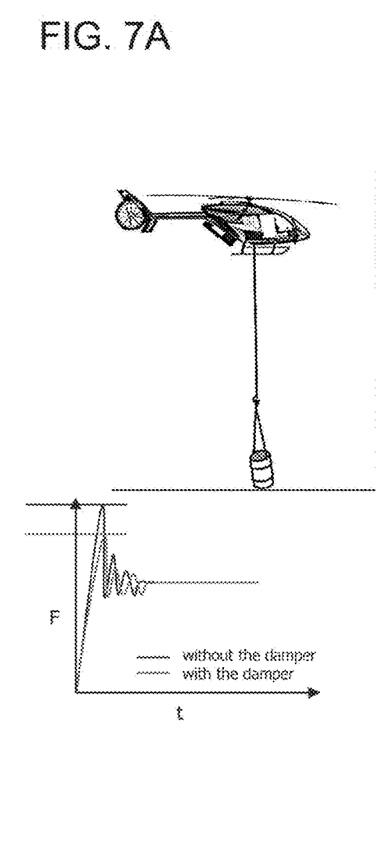
Figure 7B:
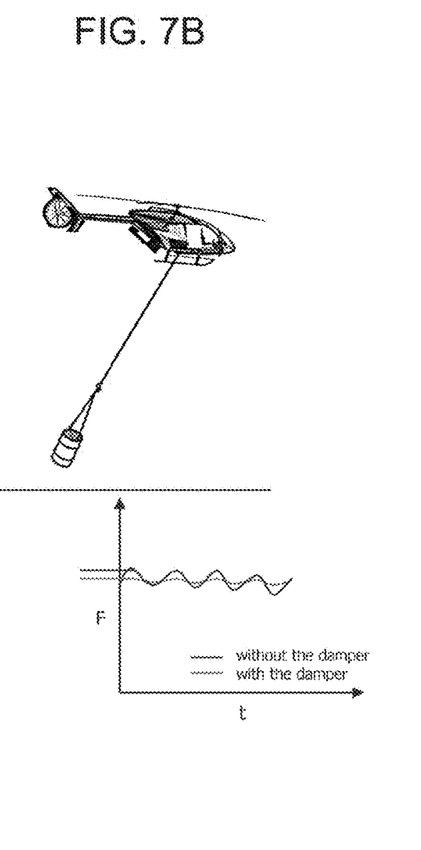
FIG. 7B shows a force diagram of the vibrating tensile forces occurring during forward flight of the helicopter, with and without the inventive load hook substructure.

The effect that can be achieved in operation, that is to say, when using the load hook substructure 1 in the case of a flight with a load carried underneath, is shown in FIGS. 7A and 7B. Here measured values are plotted in force-time diagrams in the course of various manoeuvres.

In the first state, with a load suspended underneath the helicopter with the occurrence of peak loads, the differences in the force diagram when using the inventive damping load hook substructure 1 in comparison to the classical undamped load hook substructure can clearly be discerned.

The maximum tensile force, acting when the load 4 is lifting-off, can be kept lower when using the damped load hook substructure 1.

The extensions occurring in forward flight by virtue of varying tensile forces are similarly clearly damped with the aid of the inventive load hook substructure 1. As represented, in forward flight periodically-occurring extensions, that is to say, vibrations occur, the effects of which on the cabin structure 0 are clearly damped.

LIST OF REFERENCE SYMBOLS

0 Cabin structure
1 Load hook substructure
10 Housing
   100 Housing end wall/housing flange
   101 Housing eye
   102 Housing wall
   103 Hollow cylindrical wall
11 Return spring device
   110 Spring/compression spring
   111 Spring plate
   112 Shaft guidance sleeve
   113 First shaft bearing in shaft guidance sleeve
   114 Attachment means
   115 Spring-spreader means
   116 Washer
   117 Spring retention pin
   118 O-ring
12 Shaft (anti-rotation mounted such that it can move longitudinally)
   120 Damping plate
   121 Hook attachment means 122 Shoulder
123 Plate attachment means
124 Guidance means seating
13 Damping device
  130 Damping elements
  131 Reinforcing wall
  132 Stack holder/stopper section
  133 Second bearing
  134 O-ring
  E Element stack
14 Anti-rotation device
  140 Longitudinal slot in the housing jacket
  141 Guidance means
2 Load hook
3 Load cable
4 Load

The invention claimed is:

1. A load hook substructure for attachment onto or into the cabin structure of a helicopter, comprising a housing in which a shaft with hook attachment means is mounted, such that a load hook can be connected with the shaft and thereby with the load hook substructure,
  wherein the shaft passes through an interior of the housing in a longitudinal direction between a housing end wall and a lower housing wall, such that the shaft is moveable linearly, and a return spring device is arranged between a damping plate arranged on the shaft and the housing end wall, and a damping device is arranged between the damping plate and the lower housing wall,
  wherein the damping device comprises at least one flexibly compressible damping element, which develops a damping action in the event of a linear movement of the shaft,
  wherein the housing has a hollow cylindrical wall, which encloses the interior of the housing and the therein-mounted return spring device, the shaft and the damping device, and
  wherein the load hook substructure further includes an anti-rotation device comprising at least one longitudinal slot running in the hollow cylindrical wall, in which guidance means attached to the damping plate can be moved.

2. The load hook substructure of claim 1, wherein the at least one flexibly compressible damping element comprises a plurality of damping elements, stacked one above another, arranged between the damping plate and the lower housing wall.

3. The load hook substructure of claim 2, wherein a reinforcing wall is arranged between adjacent damping elements, or between an outer damping element and the damping plate, and/or the lower housing wall.

4. The load hook substructure of claim 2, wherein the plurality of damping elements are arranged in element stacks, and each element stack is held in a stack holder, at least one sidewall of which serves as a stop.

5. The load hook substructure of claim 4, wherein the stack holders are designed to be more rigid and stiffer in bending than the damping elements.

6. The load hook substructure of claim 4, wherein each of the element stacks has the same number of damping elements.

7. The load hook substructure of claim 1, wherein the damping elements are configured in an annular shape enclosing the shaft.

8. The load hook substructure of claim 1, wherein the return spring device has a spring embodied as a compression spring, which is mounted on the housing end wall and the shaft, surrounding a shaft guidance sleeve.

9. The load hook substructure of claim 8, wherein the compression spring is operationally connected with the shaft by a spring retention pin.

10. The load hook substructure of claim 1, wherein the shaft is guided such that the shaft is moveable linearly in a first shaft bearing positioned proximate the return spring device, and in a second bearing positioned proximate the damping device.

11. The load hook substructure of claim 1, wherein the housing end wall is designed as a housing flange, by which the load hook substructure is attachable onto or into a cabin structure of a helicopter.

12. The load hook substructure of claim 1, wherein a housing eye is arranged on the housing end wall, by which the load hook substructure can be suspended directly on or in a cabin structure of a helicopter, or indirectly, by a cable, on the cabin structure.

13. The load hook substructure of claim 1, wherein the guidance means is designed as a bar, which by at least one bolt is attached to the periphery of the damping plate in a guidance means seating, and which can move through the longitudinal slot in a guided manner.

14. The load hook substructure of claim 13, wherein the shaft passes through a tension spring in the return spring device, and a spring as a damping element, and the interior of the housing surrounded by the hollow cylindrical wall is filled with a fluid such that a hydromechanical damping action is achieved.

* * * * *